(12) United States Patent
Cheron et al.

(10) Patent No.: US 6,339,798 B1
(45) Date of Patent: *Jan. 15, 2002

(54) PROCESS FOR HOOKING UP A GROUP CONTROL MODULE WITH A CONTROL MODULE AND/OR AN ACTION MODULE AND/OR A MEASUREMENT MODULE

(75) Inventors: Eric Cheron, Taninges; Emeric Motte, Sallanches; Laurent Pépin, Vougy, all of (FR)

(73) Assignee: Somfy, Cluses (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,068

(22) Filed: Oct. 22, 1997

(30) Foreign Application Priority Data

Oct. 25, 1996 (FR) .............................. 96 13052

(51) Int. Cl.⁷ .......................... G06F 3/00; G06F 15/177
(52) U.S. Cl. ............................. 710/9; 710/10; 709/220; 709/228
(58) Field of Search ................. 709/204, 220, 709/228; 710/47, 8, 9, 10, 16; 370/93; 340/815.4, 313, 825.06, 310.01; 714/5

(56) References Cited

U.S. PATENT DOCUMENTS

| 5,382,951 A | * | 1/1995 | White et al. ........... 340/825.52 |
| 5,471,190 A | * | 11/1995 | Zimmermann ......... 340/310.01 |
| 5,481,750 A | | 1/1996 | Parise et al. ................. 709/220 |
| 5,530,896 A | * | 6/1996 | Gilbert ........................... 710/9 |
| 5,606,664 A | * | 2/1997 | Brown et al. ........... 395/200.54 |
| 5,805,926 A | * | 9/1998 | Le Van Suu .................. 710/16 |
| 5,838,226 A | * | 11/1998 | Houggy et al. ......... 340/310.01 |

FOREIGN PATENT DOCUMENTS

| EP | 0 466 152 A1 | 1/1990 | ............ H02J/13/00 |
| EP | 0 495 397 A2 | 7/1992 | ............ G05B/19/04 |
| EP | 0 574 636 A1 | 12/1993 | ............ G05B/19/04 |
| EP | 0 685 778 A1 | 12/1995 | ......... G05B/19/042 |
| FR | 2 670 590 | 6/1992 | ............ G05B/19/04 |
| FR | 2670590 | 6/1992 | |

* cited by examiner

*Primary Examiner*—Le Hien Luu
*Assistant Examiner*—Beatriz Prieto
(74) *Attorney, Agent, or Firm*—Bugnion S. A.; John Moetteli

(57) ABSTRACT

The process comprises a user acting on an initial group control module so as to commence the hooking up as a first step. It also includes the following steps: a request for signaling in the network of all the modules which are hooked up with the initial group control module by comparing the addresses which they have stored with the address of the initial group control module, the user acting on one or more of the modules of the network so as to hook it up with the initial group control module or to cancel it s hookup with the initial group control module. The process is terminated by the user acting on the initial group control module in order to terminate the hookup.

16 Claims, 3 Drawing Sheets

PROCESS FOR HOOKING UP A GROUP CONTROL MODULE WITH A CONTROL MODULE AND/OR AN ACTION MODULE AND/OR A MEASUREMENT MODULE

FIELD OF THE INVENTION

The invention relates to a process for the hooking up by a user of a group control module with at least one group control module and/or one action module and/or one measurement module in a home-automation network.

PRIOR ART

Processes for hooking up a control module with action modules in home-automation networks are known in the prior art.

Patent FR-A-2 670 590, for example, shows a process for hooking up a control module with an address allocation and action module in a home-automation network. In this process, the user starts by actuating a special pushbutton, known as the hookup button, on a control apparatus, thus opening the hookup session. The user can then choose a particular control on this control apparatus and, once this choice is made, all the indicator lights of action apparatuses start flashing. The user then chooses one of the action apparatuses by pressing a local control for this action apparatus. The indicator lights of all the other unselected action apparatuses stop flashing while that of the chosen apparatus remains permanently lit. At this point the indicator lights of all the control apparatuses start flashing and the user can construct a chaining of control apparatuses. The session in which the control apparatus is hooked up with the action apparatus is terminated by placing the address of the action apparatus in memory in the control apparatus.

The major drawback of this process is that the user can hook up only a single action apparatus with a control apparatus. In order to be able to hook up several action apparatuses with a control apparatus, the user must construct a chaining of control apparatuses, with each of these already being hooked up with an action apparatus.

SUMMARY OF THE INVENTION

The object of the present invention is to provide a process that makes it possible to hook up, in a simple manner, a control module with one or more other modules, be they other group control modules or action modules or other autounits which require hooking up and are associated with devices such as roller blinds or measurement modules associated with measurement sensors such as an anemometer.

The process according to the invention includes the following step as the first step:
  action by a user on an initial group control module so as to commence the hooking up.
The process is one wherein the following steps are also included:
  request for signaling in the network of all the group control and/or action and/or measurement modules which are hooked up with the initial group control module by comparing the addresses which they have stored with the address of the initial group control module,
  action by the user on one or more of the control modules and/or on one or more of the action modules and/or on one or more of the measurement modules of the network so as to hook it up with the initial group control module if it is not already hooked up with this initial group control module or to cancel its hookup with the initial group control module if it is hooked up with the initial group control module, and
  action by the user on the initial group control module so as to terminate the hookup.

According to a particular step which is implemented solely during a first hooking up, that is to say during the creation of a new group of modules on the network, the step involving a user acting on an initial group control module so as to commence the hooking up is followed firstly by a step involving searching for a free address in respect of the initial group control module, thereby enabling it to choose an address which does not yet exist on the network and to allocate it to itself. Next, the process normally progresses on to the step involving a request for signaling of all the group control and/or action and/or measurement modules which are hooked up with the initial group control module.

In principle, given the fact that the process implemented in this case involves the creation of a new group with a new group address, none of the modules should signal an already existing hookup. Nevertheless, this step allows a check of the network and of the addresses used.

The user can then hook up modules by acting on the relevant modules so as to create the new group as described above.

Finally, the user completes the operation by acting on the initial group control module so as to end the hookup session.

Advantageously, during the search steps, the indicator lights on the modules flash in such a way as to signal to the user that the entire network is operating autonomously and that the user cannot make any modifications. In the same way, once the network has completed its autonomous operation, the indicator lights remain permanently lit or switched off so as to signal to the user that he can act on the modules.

Furthermore, in order to commence a hooking up operation, it may be useful to provide a timeout triggered by the user acting on an initial group control module. This timeout can, for example, last at least 5 seconds.

During the hooking up of a group control module with the initial group control module, the address present in the memory of the hooked up group control module is replaced with the actual address of the initial group control module. This is because a control module possesses only a single address in memory and when several control modules are chained, they become clones of one another with the same address. Any one of them can thus control the defined group.

On the other hand, during the hooking up of an action module or of a measurement module with the initial group control module, the unused addresses on the network located in the memory of the action module or measurement module are erased and the address of the initial group control module is added to the memory of the action module or measurement module.

It may be advantageous for the user to act differently on the initial group control module in order to commence hooking up if the user wishes to modify an existing group or if he wants to create a new group. For example, if the user wishes to modify an existing group, the action involves pressing a hookup modification button and, if the user wishes to create a new group, the action involves pressing a hookup creation button. Thus, the step of searching for a new address, which is only executed when a new group is created, is implemented when the hookup creation button is pressed.

The device for implementing the process according to the invention comprises a network, at least one group control module, at least one action module and/or at least one measurement module. The network uses either carrier currents, or cables, or alternatively optical means, such as fibers, or radio-electric means as the transmission medium. The modules generally include at least one input and one output, RAM and ROM memories, an indicator light, a pushbutton, a power supply, a computer and possibly a clock. The action modules which make it possible to control motors or actuators also include a switching element for performing this control, whilst the measurement modules include an acquisition system which enables them to place in memory the value or values measured by the sensor associated with them.

BRIEF DESCRIPTION OF THE DRAWINGS

A better understanding of the process according to the invention will be gained through reading the description of an embodiment and of the figures which relate thereto.

The figures represent, by way of example, an embodiment of the invention.

Figure 1:
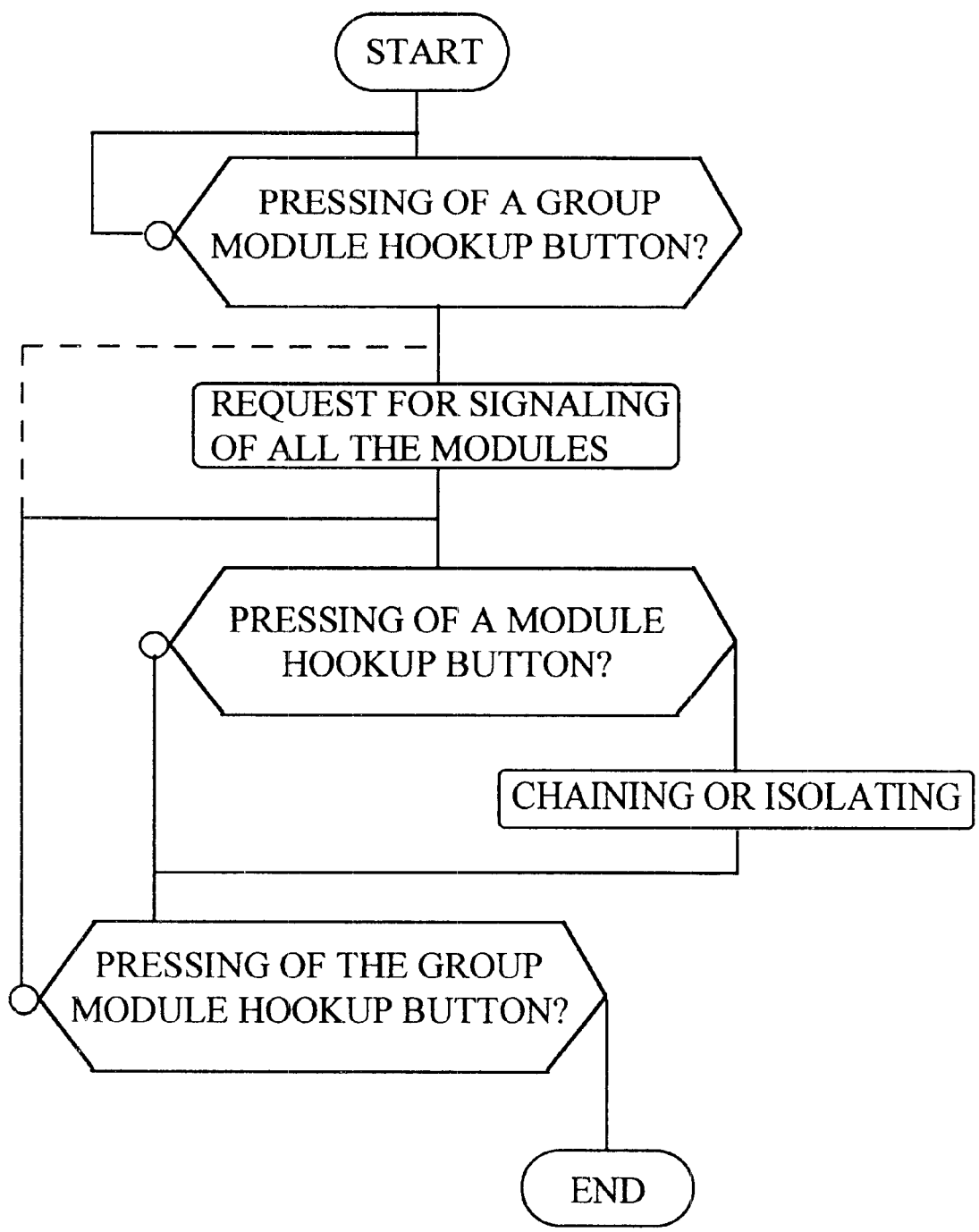
FIG. 1 is a flow chart of the process according to the invention.

The process is firstly described with reference to FIG. 1.

DESCRIPTION OF THE PREFERRED EMBODIMENT(S)

The hooking up session commences with a user acting on an initial group control module so as to begin the hooking up, in other words—pressing a hookup button. In the general case of the hooking up process, the initial group control module issues a request of signaling of all the modules of the network, be they group control or action, or alternatively measurement modules, that are hooked up with it and, at the end of this step, they signal themselves to the user, for example by a continuously lit indicator light.

The process continues by a user acting on one or more control modules and/or on one or more action modules and/or on one or more measurement modules of the network so as to hook it up with the initial group control module if it is not already hooked up with this initial group control module or to cancel its hookup with the initial group control module if it is already hooked up with this initial group control module. This step is carried out by pressing a hookup button for each module and results in a chaining of the module if the latter had not already been hooked up with the initial control module, or in isolating the module if the latter was hooked up with the initial module. Pressing a button for hooking up the selected module stores the address of the initial group control module in the memory of the selected module,. which means that the latter belongs to the group, or erases the address of the initial group control module from the memory of the selected module, the result being that the latter no longer belongs to the group. During this step, each successive pressing of the button for hooking up a module allows it to be chained with the initial module or to be isolated from the initial module. In the course of a hookup session, the user can therefore modify the chaining or isolation of the relevant modules at any moment by pressing on their hookup buttons. Once the chosen module has been hooked up with the initial group control module, it signals this to the user, for example by a continuously lit indicator light. Similarly, when the hooking up of a module with the initial group control module has been canceled, the module deleted from the group also signals this to the user, for example by an indicator light which is switched off. In this way, it is very easy for the user to determine which modules belong to which groups. This step of the process is looped so that the user can modify the configuration of the group as often as he desires, by acting on the modules of the group.

The hooking up process exits this loop and is terminated by a user acting on the initial group control module, for example by pressing the hookup of the initial group control module. At this point, the initial group control module and all the selected modules of the group signal to the user that the hookup session has terminated, for example by switching off their respective indicator lights.

The process which enables a new group to be created-is described with reference to FIG. 2.

The first step is the same as that for the process according to FIG. 1, that is to say the user acting on an initial group control module so as to begin the hooking up, for example on a pushbutton initiating a group creation mode. The second step involves a search by the initial group control module for a free address on the network which will become that of its group. Once this address has been found, it is placed in memory in the initial group control module. The next step is a request for signaling on the network of those modules that have already been hooked up as in the case of a normal hooking up such as that described above, which terminates in these modules signaling to the user. Next, as in the process described above and represented in FIG. 1, the following step enables the user to construct his group by acting on the modules which he chooses and enables him to hook them up with the initial group control module. In the same way as before, the respectively hooked up modules signal the fact to the user by means of a continuously lit indicator light for example. To terminate this group creation session, the user acts on the initial group control module, for example on the creation mode button.

As described above, the initial group control module and all the selected modules of the group then signal to the user that the hookup session has terminated, for example by switching off their respective indicator lights.

Figure 2:
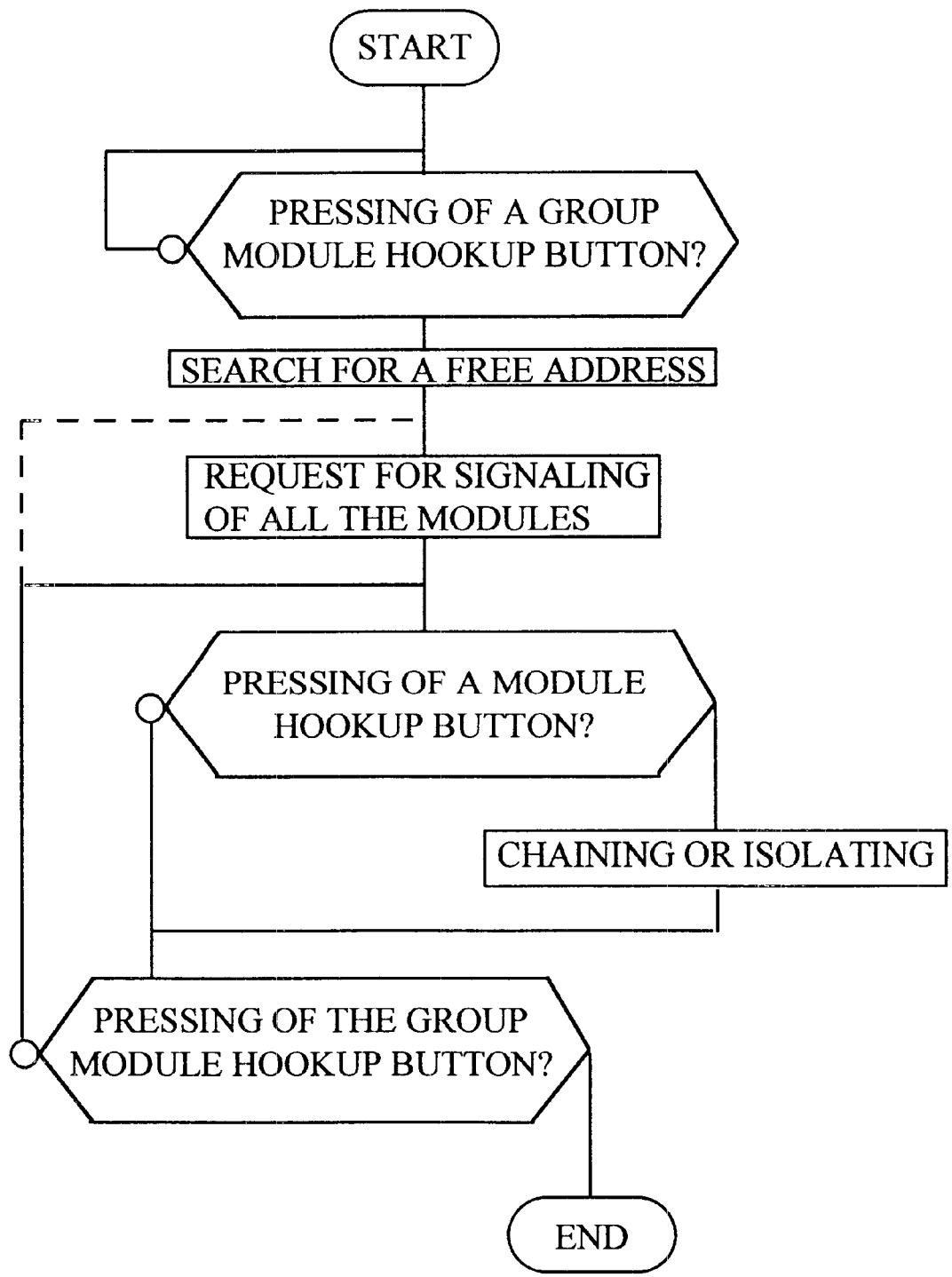
FIG. 2 is a flow chart of the process according to the invention during the creation of a new group.

According to a process variant represented by dashed lines in FIGS. 1 and 2, the step involving a request for signaling of all the modules of the network already hooked up with the initial group control module can be performed not just once, at the beginning of the hookup session, as represented in FIGS. 1 and 2, but additionally after each hooking up action or cancellation action. The return from the loop emanating from the "PRESSING OF THE GROUP MODULE HOOKUP BUTTON?" block which terminates the session would now be done upstream of the "REQUEST FOR SIGNALING OF ALL THE MODULES" block rather than downstream thereof.

To avoid errors, the start of a hookup session can be related to a timeout, with the user having to act on the initial group control module for a certain time, for example having to press the hookup button for at least five seconds.

Figure 3:
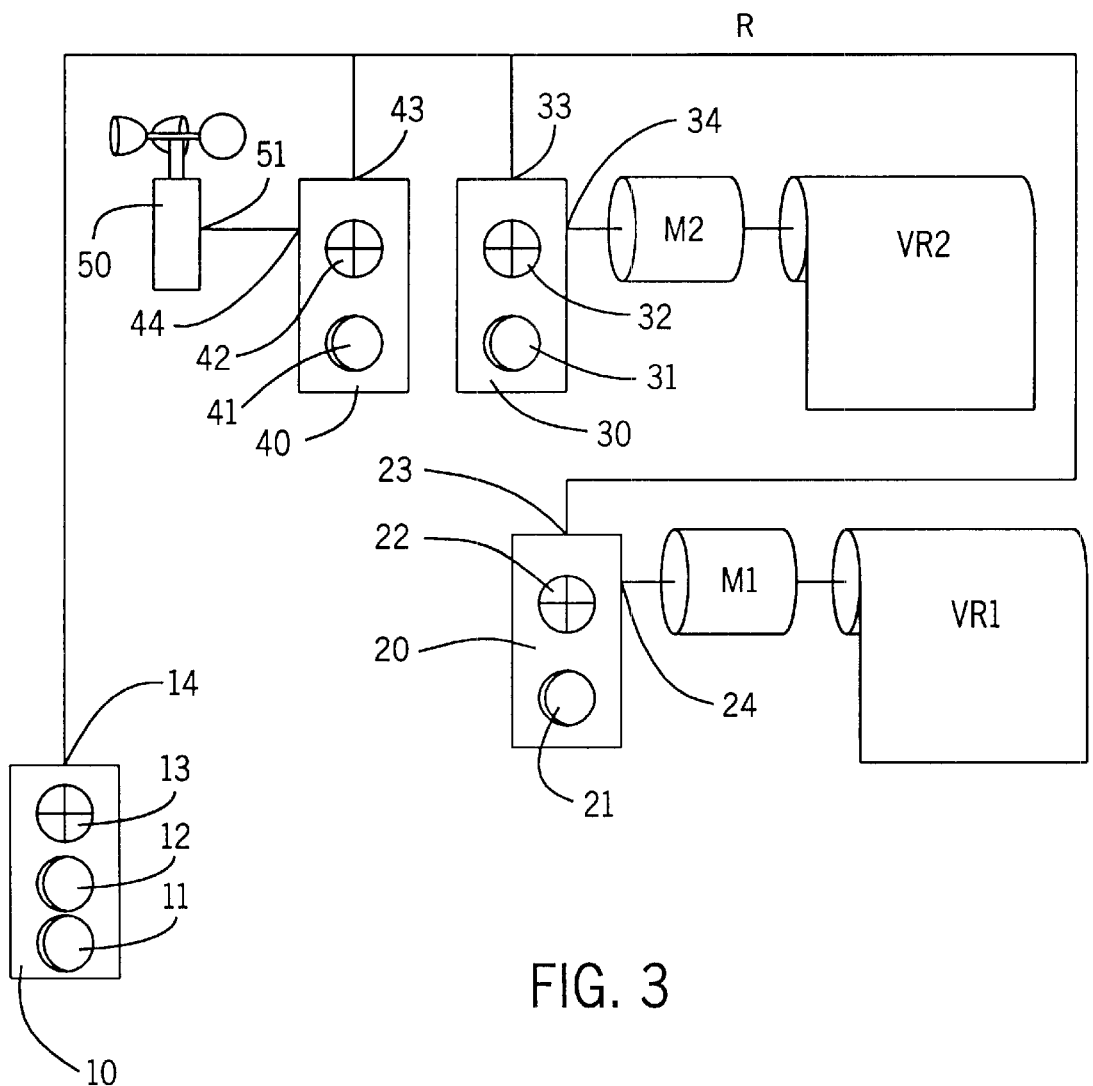
FIG. 3 is a block diagram of a device that enables the process to be implemented.

A device for implementing the process is represented diagrammatically in FIG. 3.

This device comprises a network R, a group control module 10, having two hookup buttons 11, 12, one for hooking up in an existing group and the other for the creation of a new group, an indicator light 13 and a network input/output 14. The device additionally comprises two action modules 20 and 30, each comprising a hookup pushbutton 21, 31, an indicator light 22, 32, a network input/output 23, 33, and an actuator input/output 24, 34. These actuator inputs/outputs 24, 34 are linked to motors M1 and M2 which drive roller blinds VR1 and VR2. The device further comprises a measurement module 40 having a hookup pushbutton 41, an indicator light 42, a network input/output 43 and an input/output 44 linked to the sensor 50, in this case an anemometer.

The group control module includes a memory which allows a group address to be stored. The action and measurement modules also include a memory, allowing several group addresses, for example 15 addresses, to be stored.

The embodiment described is given solely by way of example and variations are possible within the framework of the protection claimed. For example, during the hooking up of an action module or of a measurement module with an initial group control module, the latter could erase all the addresses which no longer exist on the network and which are still stored in the hooked up action of measurement module.

What is claimed is:

1. A process for the hooking up by a user of a group control module with at least one other group control module and/or an action module and/or a measurement module in a network, comprising the following step as the first step:
    action by a user on an initial group control module having an initial address so as to commence the hooking up, said process being one wherein the following steps are also included:
        request for signaling in the network of all the group control and/or action and/or measurement modules which are hooked up with the initial group control module by comparing the addresses which they have stored in a memory with said initial address which is included in said request,
        action by the user on one or more of the control modules and/or on one or more of the action modules and/or on one or more of the measurement modules of the network so as to hook it up with the initial group control module if it is not already hooked up with this initial group control module by storing said initial address in said control modules memory and/or in said action modules memory and/or in said measurement modules memory so that said initial address is stored in a decentralized manner in each of said modules, or to cancel the hookup with the initial group control module if it is hooked up with the initial group control module by removing said initial address from said control modules memory and/or from said action modules memory and/or from said measurement modules memory, so that said initial address is removed in a decentralized manner from each of said modules, and
        action by the user on the initial group control module so as to terminate the hookup.

2. The process as claimed in claim 1, wherein, during the creation of a new group of hooked up modules, the process comprises the following step as the second step:
    search in the network for a free group address and storage of this address in the initial group control module.

3. The process as claimed in claim 1, wherein the modules which are hooked up with the initial group control module, or which become hooked up with the said initial module, signal themselves to the user via a continuously lit indicator light.

4. The process as claimed in claim 1, wherein the modules which are not hooked up with the initial group control module, or whose hookup with the said initial module is canceled, signal themselves to the user via an indicator light which is permanently switched off.

5. The process as claimed in claim 1, wherein in order to commence a hooking up operation, the user must act on an initial group control module for at least 5 seconds.

6. The process as claimed in claim 1, wherein during the hooking up of a group control module with the initial group control module, the address present in the memory of the control module is replaced with the actual address of the initial group control module.

7. The process as claimed in claim 1, wherein during the hooking up of an action module or of a measurement module with the initial group control module, the unused addresses on the network located in the memory of the action module or measurement module are erased and the address of the initial group control module is added to the memory of the action module or measurement module.

8. The process as claimed in claim 1, wherein the user acts differently on the initial group control module in order to commence hooking up if the user wishes to modify an existing group or create a new group.

9. The process as claimed in claim 8, wherein if the user wishes to modify an existing group, the action involves pressing a hookup modification button and, if the user wishes to create a new group, the action involves pressing a hookup creation button.

10. The process as claimed in claim 1, wherein the step involving a request for signaling in the network of all the group control and/or action and/or measurement modules which are hooked up with the initial group control module also occurs each time the user acts on a control module or on an action module or on a measurement module of the network so as to hook it up with the initial group control module or to cancel its hookup with the initial group control module.

11. The process of claim 1 further comprising:
    said group control module being a first module operatively coupled through a network input/output to a second module;
    said action by the user being accomplished through the manual operation of a first and second hookup button which selectively illuminate or extinguish first and second indicator lights to show hooking up or disconnecting, respectively;
    said first and second modules being operatively coupled through a respective first and second input/output to an actuator input/output wherein said actuator input/output controls a motor, said motor moving roller blinds responsive to an operatively coupled measurement module and a linked sensor.

12. A process for the hook up by a user of a group control module with at least one other group control module and/or an action module and/or a measurement module in a network, comprising the following step as the first step:
    action by a user on an initial group control module so as to commence the hooking up, said process being one wherein the following steps are also included:
        requesting a signal in the network of all the group control and/or action and/or measurement modules which are hooked up with said initial group module by comparing the addresses which they have stored in a memory with the address of said initial group control module sent in the network,
        action by the user on one or more of the control modules and/or on one or more of the action modules and/or on one or more of the measurement modules of the network so as to hook it up with said initial group control module if it is not already hooked up with said initial group control module by storing said address of said initial group control module in a decentralized manner in said memory of each of said modules or to cancel its hook up with said initial group control module if it is hooked up with said initial control module by removing said address of said initial group control module in a decentralized manner from said memory of each of said modules, and action by the user on said initial group control module so as to terminate the hookup, and in which the address of the controller of the group is at the same time the group address thus simplifying the data necessary.

13. A hook up to interconnect a first and second modules in a network, said first module being a group control module and said second module being another group control module, an action or a measurement module, comprising:

commencement means for a user to act on said first module so as to initiate a hook up from said first module having a first address;

network signal requesting means for sending said first address in said network;

comparison means for comparing said first address with a second address stored in a memory of said second module, signaling means for signaling said second module if said second address is equal to said first address, hook up means for operatively controlling said first and said second module so as to hook up said modules if not already hooked up by storing said first address in said memory of said second module, or to cancel the hookup if already hooked up by removing said first address from said memory of said second module, and termination means for terminating the hookup.

14. The network hook up of claim 13 wherein:

said first module address is at the same time the group address thus simplifying the data necessary.

15. The network hook up of claim 13 further comprising:

said first module being operatively coupled through a network input/output to at least a second module;

said network signal requesting means being a manually operable first hookup button to modify an existing group or a second hookup button to create a new group and said signaling means being an indicator light;

said second module being operatively coupled through a first input/output to said network and through a second input/output to a motor, said motor moving roller blinds, and said second module being hooked up in said group or being unhooked of said group by said hook up means which comprise a hookup button.

16. The network hook up of claim 14 further comprising:

said first module being operatively coupled through a network input/output to at least a second module;

said network signal requesting means being a manually operable first hookup button to modify an existing group or a second hookup button to create a new group and said signaling means being an indicator light;

said second module being operatively coupled through a first input/output to said network and through a second input/output to a motor, said motor moving roller blinds, and said second module being hooked up in said group or being unhooked of said group by said hook up means which comprise a hookup button.

\* \* \* \* \*